Oct. 27, 1970  J. WINKLER  3,536,480

METHOD OF FORMING INORGANIC FOAM MATERIALS

Filed Jan. 12, 1967

INVENTOR.
JOSEPH WINKLER

BY

*Ward, Haseltine, McElhannon, Orme, Brooks, & Fitzpatrick*
ATTORNEYS

United States Patent Office 3,536,480
Patented Oct. 27, 1970

3,536,480
METHOD OF FORMING INORGANIC FOAM MATERIALS
Joseph Winkler, Hazleton, Pa., assignor, by mesne assignments, to Tenneco Chemicals, Inc., New York, N.Y., a corporation of Delaware
Filed Jan. 12, 1967, Ser. No. 608,876
Int. Cl. B22f 7/04
U.S. Cl. 75—208
8 Claims

ABSTRACT OF THE DISCLOSURE

Described herein is the formation of inorganic foam materials by applying a silver coating to polyurethane foam followed by either the chemical deposition of a metallic layer upon the silver layer or the application of sinterable inorganic particles followed by sintering treatment.

---

Figure 1:
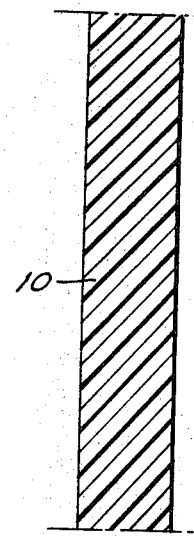

This invention relates to porous materials and more particularly to open-pore cellular foams of materials such as metals, metal alloys, metal oxides, ceramics, glasses and the like. More specifically, it relates to novel methods for producing novel, sturdy, well-formed, porous cellular foams.

Cellular materials, particularly those of metals and metal alloys, have come into prominence in recent times, primarily because of the unusual combinations of physical characteristics that can be imparted to them. For example, cellular materials in the form of metal foams can be fabricated as soft, hard or rigid material having a variety of applications. When the metals are the high melting refractory type such as tungsten, molybdenum, columbium, hafnium and their alloys, and the pores are subsequently filled with lower melting metals such as lithium, silver and the like, the structures are resistant to ultrahigh temperatures and erosion and are useful in the manufacture of rocket nozzles.

When made of high melting metals, glass or ceramics, the foams are useful as filtering devices for hot liquids and gases. Foams made from alumina, silica and the like, provide excellent support materials for catalysts because of their large surface area per unit volume. Other metal foams can be used as heat exchange devices or can be filled with abrasive material thereby providing good drilling and grinding tools.

Although inorganic foam bodies, as can be seen from the above, open up entirely new areas of technology, the art has been seriously hampered in that available processes for producing the foams have inherent disadvantages which greatly affect the quality of the foamed material produced.

For example, current modes of producing inorganic foams primarily involve one of two general methods. One method involves dispersing the desired inorganic material throughout a foamable composition, and then foaming the entire mixture. While this method is usually effective, it is only useful where cell structure is immaterial such as in the preparation of lightweight building materials. This is so because the internal cell structure actually consists of cells or vacuoles surrounded by solid masse of the inorganic material. There is little, if any, continuity of space throughout the material rendering the mass incapable of allowing gas or liquids to pass through.

The other method which has received fairly widespread attention basically involves impregnating an existing organic foamed material with the desired inorganic material, the latter usually being in the form of a slurry, and burning away the organic foam to leave an inorganic skeletal structure. For example, in U.S. Pat. No. 3,111,396 issued to Ball on Nov. 19, 1963, and assigned to General Electric Company, there is described such a process.

In this process the patentee forms a slurry of the inorganic material and desirably a binder therefor, in a suitable liquid vehicle, and impregnates a slab of open-pore polyurethane foam therewith. After evaporation of the liquid vehicle, the impregnated slab is fired at a high temperature to (a) decompose the organic skeleton, (b) carbonize and ultimately fire away the organic binder materials if any were used, and (c) sinter the inorganic particles to a unitary form. The difficulty with this procedure is that if no binder is used to hold the particles together, the subsequent elimination of the underlying polyurethane core removes essentially all support for the inorganic particles originally coated thereon with the result that the inorganic layer, to a very great extent, crumples and collapses. On the other hand when a binder material is incorporated into the slurry to provide support for the particles, the problem is only partially eliminated. This is so because the binder material, of necessity, takes up space that could have been occupied by more inorganic particles and to that extent results in a difficultly sintered product and one which is greatly reduced in volume. Moreover, although the bound inorganic coating will tend to be more firm upon heating and removal of the underlying polyurethane structures, subsequent heat treatment at sintering temperature will cause the binder to decompose prior to the sintering of the inorganic particles. Since the particles are no longer bound, the inorganic structure will tend to collapse easily before sintering.

Similarly, in U.S. Pat. No. 3,090,094 issued May 21, 1963 to Schwartzwalder et al., and assigned to General Motors Corporation, the patentees describe much the same procedure as is disclosed in the Ball patent except that the inorganic materials are ceramics. As can be appreciated by those skilled in the art, the prior art processes, typified by the above-mentioned patents, utilize techniques which tend to limit the amount of inorganic material that can go into a formed body. When this is considered with the inherent difficulties in providing a unitary porous body from small particles, it will be realized that the means for achieving good results are in conflict with the end sought.

The present invention, in addition to overcoming and substantially eliminating the aforementioned problems, provides a process for producing a novel versatile open-pore silver foam structure from which other inorganic foams may be prepared in any of several ways. In general, the process involves chemically depositing a layer of silver onto substantially the entire surface, internal and external, of an open-pore organic structure so that the silver layer coats the strands and nexae of the foam and essentially replicates the cell structure of the underlying foam material. There results from this a silver foam which is an excellent conductor of electricity and heat and which may be used without any further treatment.

In accordance with a further aspect of the invention, however, the silver foam is used as a support structure for the further application of inorganic material thereon to produce a wide variety of inorganic foams.

In accordance with this aspect, there is cast upon the silver coating an inorganic material which may be any of a wide variety of materials, but which, in any case, are either sinterable in particle form or are capable of being reduced to a solid elemental layer from a solution containing a higher valence form of said material. Sinterable inorganic substances may be applied to the silver foam in the form of small particles dispersed throughout a suitable medium. The resulting structure is then fired at temperatures and for periods of time sufficient to sequentially decompose the underlying organic foam structure to volatile liquids and vapors, and sinter the inorganic particles into a unitary form.

The temperatures may be gradually raised as each one of these operations is completed. The effect of this novel process is to allow the application of an inorganic layer, which need not contain any binder material, and which therefore has maximum concentration of inorganic particles dispersed therethrough, onto a silver layer which provides support therefor. Maximum particle packing can be obtained, thereby minimizing the danger of shrinking and collapse upon subsequent removal of the underlying organic structure and sintering of the inorganic material. It should be emphasized that the inorganic material is deposited upon a silver support layer, which itself is deposited upon the underlying organic foam structure. Each layer essentially replicates that of the organic structure. The resulting foam structure represents a novel composition.

When the inorganic substance to be deposited is capable of being reduced from a solution to a solid layer, as in the case of many metals, the silver foam of the present invention is particularly amenable to such treatment. When this approach is employed, the firing step for the removal of underlying organic foam material and melting of the silver layer may be dispensed with depending on the ultimate utility of the foam. For example, if the metal coating is nickel and the foam is to be used as a catalyst in a moderate temperature vapor phase or liquid reaction, the presence of the organic substrate may not be detrimental.

More particularly, the open-pore organic structure which are employed in the present invention, are preferably essentially completely open-pore polyurethane foams. By essentially completely open-pore is meant foams which have essentially no membranes between strands or nexuses of the foam. Such foams are typically referred to as "reticulated" or "100% open pore" foams and are described in U.S. Pat. No. 3,171,820. Of these, it is preferred to use foams which have open cell sizes ranging from 10-100 pores per linear inch. Also suitable for use, are other foams which, although referred to as open pore, actually are of the order of 70-80% open-pore with the remainder being closed pore. While suitable, they are not as desirable as the essentially completely open pore structure for the reason that subsequent deposition of the silver coating and application of the inorganic layer will be limited to the extent that closed pores exist. The inorganic foam produced from such a structure will then be correspondingly less homogeneous. It will be understood, however, that the foams so produced nevertheless exhibit the qualities and attributes of the invention and are superior to inorganic foams produced from the very same organic structures using prior art techniques.

The organic foam itself, although preferably a polyurethane, may be any open pore organic foam. When the ultimate inorganic substance is applied in the form of small particle, the organic foam should be heat decomposable to volatile products at reasonable temperatures and thus be easily removable from the silver layer which is deposited thereon. Polyurethanes are eminently suited for this purpose being normally completely decomposable at temperatures between about 175° C. to 275° C.

Once the foam material has been selected, it is next preferably pretreated to facilitate the application of a layer of silver onto the strands of nexae of the foam, thereby to coat substantially the entire cellular and external surface thereof. A convenient pretreatment procedure involves treating the foam with a solvent to remove any surface grit or oil from the inner depths of the foam structure. This may be done by compressing and decompressing the foam in the particular solvent. The aliphatic hydrocarbons, such as hexane, heptane, octane, nonane, decane and alkanols such as methyl, ethyl, and propyl alcohols are useful as solvents. Among the hydrocarbon, hexane is preferred.

After cleaning, a layer of silver is next deposited on the entire surface of the foam. This is conveniently achieved by chemical reduction techniques, and especially by using silver mirroring techniques. For example, the foam is placed in a solution containing silver ions capable of being reduced to elemental silver. In a preferred embodiment, the solution is an ammoniacal silver nitrate solution which has been freshly combined with a reducing agent. To insure substantially complete coating of the strands and nexae throughout the intricate pore structure, the foam is repeatedly squeezed and decompressed several times, to soak up maximum amounts of silvering solution. The reduction process is then allowed to proceed until the desired amount of silver has been deposited or until the solution fails to operate effectively. The actual solutions used to perform the deposition of silver may be any of those normally employed in the silvering art. For example, ammoniacal silver nitrate solution is very satisfactory as the source of silver and is preferred. Other water soluble silver salts may be used if desired such as silver perchlorate and silver fluoride. Similarly, various reducing agents such as sugars, and especially sucrose, as used in the Brashear silvering process, potassium sodium tartrate as used in the Rochelle salt silvering process, and aldehydes such as formaldehyde, are all conveniently employed.

The silver coating is generally applied in an amount sufficient to comprise from about five to fifty percent by weight based on the total weight of the silver coated foam, and preferably from twenty to forty weight percent. When so constituted, the foam generally retains to a great extent its original sponginess and resiliency. It can be compressed as desired and will generally assume its original shape when the stress is released. When firmer silver foams are desired, more silver may be deposited to build up the layer.

As indicated previously, the resulting foam is a good conductor of electricity and heat and is suitable for use without any further treatment. Alternatively, in accordance with a preferred aspect of the invention, the silver foam is itself used as a substrate for the further deposition of yet another layer of inorganic material. As indicated previously, the inorganic materials which may be deposited on the silver foam are not limited to those which are sinterable, as required by prior art techniques. This is in consequence of the versatility of the silver foam which, by virtue of the silver coating, is electrically conducting and amenable to electro deposition techniques.

When the inorganic material is sinterable in powder form, it is conveniently cast as a thick, cream-like, preferably thixotropic mixture of the powdered material in a suitable liquid, preferably water. The inorganic materials useful in the presently described aspect of the invention are those capable of being reduced to small particle size, such as powders, in which form the particles are heat sinterable. Sintering is the term used to describe the ultimate integration of powdered materials to a solid, coherent, continuous body under the influence of sufficient heat. In addition, the materials used herein should be sinterable without the use of compacting pressure. During the sintering operation described herein, a compaction of the rather loosely adhering inorganic powder first takes place followed by a final consolidation of the solid body as higher firing temperatures are reached. To facilitate this fusion step, void closure between particles is necessary. This void closure proceeds faster and more completely when the particles are spherically shaped and when the particles themselves are as small as possible. The use of such material is preferred.

Furthermore, it is an additionally preferred aspect of the invention to use at least two different particle sizes of inorganic material in order to provide maximum areas of surface contact in the packed layer. One such particle size is a fraction of the size of the other, normally being about one-ninth the size. From a mathematical standpoint this relationship gives about the best ratio for optimum surface contact. Different ratios may be used if desired. The particles are usually employed at levels of about 70–75 weight percent of the larger size with from 25–30 weight percent of the smaller size. A suitable composition comprises 75 weight percent of 44 micron material and 25 weight percent of 5 micron material. Additional smaller sized particles can be added, if desired.

As suitable sinterable inorganic materials there may be mentioned metals such as those of Groups 1 through 8 of the Periodic System of Classification and illustrated by copper, beryllium, aluminum, silver, tungsten, molybdenum, columbium, vanadium, manganese, hafnium, chromium, nickel, iron, cobalt, platinum and the like and their alloys; metal oxides such as aluminum oxide, zirconium oxide, thorium oxide, titanium oxide, and the like; non-metallic oxides such as silica; various silicates such as glass; carbides such as silicon carbide; and the like. Preferred are nickel, copper and silica.

As stated previously, the inorganic powder is conveniently applied to the silver foam by first intimately dispersing the powder in a volatile liquid medium and then impregnating the foam with the powder composition. In order to form a closely packed layer of inorganic particles, it is desirable to use a composition which is sufficiently highly concentrated with the inorganic material to provide a thick, paste like vehicle. It is also preferred that the mixture be thixotropic to avoid the tendency that non-thixotropic mixtures have of running out of the foam matrix prior to drying. Gelling agents may be used to achieve this condition. As suitable gelling agents there may be mentioned the water soluble, organic polymer type representative of which are polyacrylamides, polyacrylic acids, polyalginates, polyvinyl alcohol, high molecular weight polyglycols, starch, modified water soluble cellulosics such as methyl cellulose and carboxymethyl cellulose, copolymers of vinyl acetate with pyrolidone and the like. Preferred for use herein is a *polyacrylamide* of the general chemical formula:

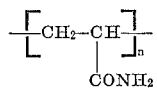

known as Acramer 250 available from American Cyanamid.

In general, compositions containing from 30 to 55% of the inorganic powder, and from 0.1 to 2.0 wt. percent of the gelling agent based on the entire weight of the composition, with the remainder being the volatile liquid medium, produce suitable results. The preferred amounts are from 40 to 45 wt. percent for the powder and from 0.5 to 1.0 wt. percent for the thixotropic agent. This mixture is normally applied in amounts sufficient to provide a layer of inorganic material, ranging from 0.5 to 20 and preferably 1 to 3 times the original weight of the foam.

The liquid medium referred to is preferably water. A water-miscible, volatile, organic solvent, such as methanol, ethanol, isopropanol and the like may be added for faster drying. The impregnation with this paste-like fluid is best performed by spreading it on both sides of the silver coated foam and running the structure through wringers and rollers until an apparent uniform distribution of the fluid on top and inside the form structure is achieved. By this method as much as 90 weight percent solids and more can be imparted to the silver covered foam based on the weight of the entire foam structure, if desired.

After the inorganic layer has been applied, the structure is then treated by drying, for example, to drive off the liquid vehicle from the inorganic layer, leaving what in effect is, a multilayer foam structure comprising the underlying organic foam base, an inorganic coating layer on the silver layer. The drying may be effected by any known means, but it is preferred to direct a flow of warm air or an inert gas stream such as nitrogen, argon, hydrogen and the like, over the structure. The gas temperature is suitably of the order of 150–250° F. at which temperature dry products are obtained in relatively short periods of time, of the order of 5 to 30 minutes. The dried foam, loaded through its matrix with coherent and adherent layers of silver and the inorganic composition, is next subjected to a higher temperature pyrolysis step, whereby the underlying foam is removed and the inorganic powdery top layer is sintered to a coherent, structurally strong, reticulated, open-cell body, replicating the shape of the open-pore silver matrix upon which it was supported.

The double operation is suitably performed in the same oven at properly increasing temperatures by first contacting the foam with flowing air, nitrogen or the like, heated to a temperature sufficient to decompose the foam. For urethane foams, practically all of the foam is destroyed and converted mostly to gaseous and vaporous decomposition products which are carried away with the passing gas stream at temperatures of from about 175–275° C. Other gases, such as reducing gases, illustrated by carbon monoxide and hydrogen, for example, may be employed to convert any carbonaceous, non-volatile organic material to volatile forms and to reduce metallic oxide impurities to free metal, when a metallic foam is being made. Ordinarily, much higher temperatures are necessary to melt away the silver substructure and finally sinter and fuse the inorganic powdery material to a coherent body. The necessary heat is applied to the foam, preferably by using a hot gas which is blown through the foam in an electrically heated oven. In most cases, hot nitrogen or argon is used, but for highly oxidizible metals such as aluminum, zirconium, or beryllium, hot hydrogen is preferred. To sinter and fuse high melting oxides such as silica, alumina, glass and metals such as zirconium, tungsten, columbium and the like, hot argon or helium or even molecular hydrogen provided by plasma jet guns are generally useful. The actual sintering temperature will vary with the particular inorganic material from which the open-pore cellular structure is prepared. This will normally be relatively close to, but not at, the melting point of the materials, as is known. In general, temperatures ranging from 5–50 degrees centigrade below the true melting point or softening point of the inorganic material will be suitable.

The sequential pyrolysis described above is effective to decompose and volatilize the organic foam structure, melt away the silver substructures and sinter and fuse the inorganic particles into a solid, unitary, continuous open pore foam essentially replicating the cell structure of the original foam material. The sequence of steps described, i.e. a gradual increase in temperature to accomplish each stage is preferred for the reason that vigorous bubbling and dislocating factors are avoided in this manner. Sudden exposure to, for example, sintering temperatures, prior to essentially complete removal of the organic substructure may tend to disturb the inorganic structure.

When the inorganic material to be deposited on the silver foam is a metal which is capable of being reduced from a solution to a solid layer of the elemental metal, the versatility of the silver foam is uniquely suited to serve as the substrate. The reduction may be either a chemical or electrochemical reduction. Of these, electrochemical reduction is preferred. Illustrative of such metals are copper, nickel, cobalt, chromium, zinc, tin, cadmium, silver, platinum, gold and the like. Such metals may be deposited on the silver foam by techniques normally employed in the electroplating art. However, care should be taken to insure that any solutions from which the metal is to be deposited intimately wet all the surface of the silver foam matrix. This will facilitate the deposition of a layer uniformly on the silver layer throughout the foam. The silvered foam itself is used as the cathode and will serve as the site where reduction takes place. The anode is generally a slab of the metal which is to be deposited.

As for the amount of current to be used, conventionally employed current densities, depending on the metal to be deposited, may be used. For example, suitable current densities for various materials are, for sizes from 3–15 amps per 2 square feet of surface area; for copper, 75–150 amps per 2 feet, for chromium, 100–300 amps per 2 feet, for zinc, 10–50 amps per 2 feet.

The solutions from which the metal is deposited are in general, any of those normally encountered in the electroplating art. For example, nickel is conveniently deposited from an acidic solution of nickel sulfate, copper from an acid solution of the sulfate or an alkaline cyanide copper solution, chromium from chromic acid solutions, and the like. Additional ingredients may be employed such as those which increase anode corrosion, conductivity, regulate acidity and the like.

As indicated above, the silver foam may also be used as the substrate for the chemical deposition of metals thereon. In general, any metal capable of being reduced from a solution of its ions may be deposited in this manner much in the same manner as the original silver layer was deposited, that is by using a chemical compound as the reducing agent. Such metals as gold, platinum and rhodium may be deposited in this manner.

Figure 3:
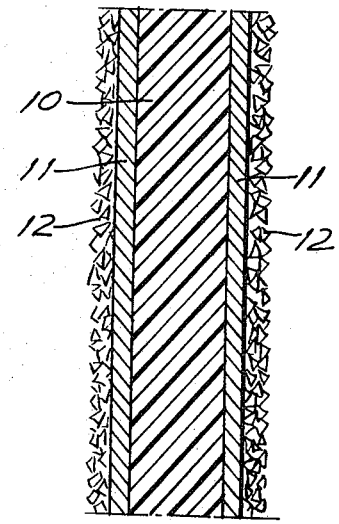
Figure 2:
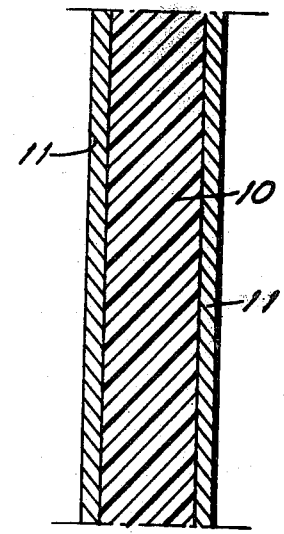
Figure 4:
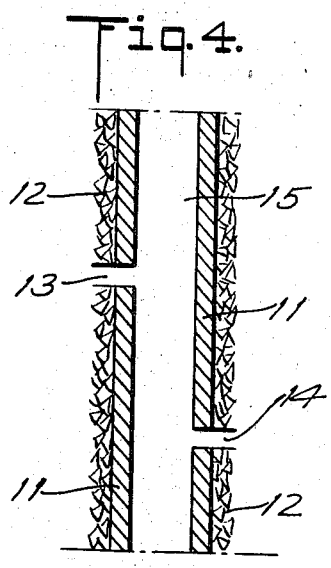
Figure 5:
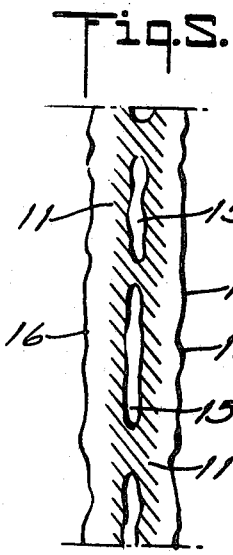

Reference is now made to the drawings in which there are presented exaggerated views of a polyurethane strand, as it appears through the various stages of producing an inorganic foam from sinterable particles. More particularly, FIG. 1 represents generally a strand designated 10 before it is coated. FIG. 2 represents a coated polyurethane strand 10 after a silver layer 11 has been deposited thereon. FIG. 3 represents the strand of FIG. 2 wherein sinterable metal particles 12 are applied to the silver layer 11. FIG. 4 represents the strand of FIG. 3 as the polyurethane strand begins to volatilize under heat. Somewhat of a contraction begins to occur as volatiles produced by heating the polyurethane material begin to escape through the silver layer 11 at various points 13 and 14, leaving void space 15. FIG. 5 represents the strand of FIG. 4 as sintering temperature is approached. In general, silver layer 11 becomes amalgamated with the metallic particles 12 to form an underfined interface. The outer layer of particles 12 are sintered to a coherent, somewhat roughened, layer 16. Void spaces 15 created in FIG. 5 by the vaporization of the polyurethane strand begin to close, thus rendering the resulting strand somewhat more dense. When non-metallic inorganic sinterable particles are used, the interface between the silver and the sintered inorganic material is not amalgamated and is therefore more precisely defined. On the other hand, when a metallic layer has been chemically or electrically deposited on silver layer 11, the resulting structure is substantially the same as in FIG. 5 except that layer 12 is somewhat smoother in texture than the layer obtained from sinterable particles.

The following examples are given for purposes of illustration only and are not to be regarded as limiting.

EXAMPLE 1

The following solutions are prepared:

Solution 1.—200 cc. of distilled water in which 18 gms. of sugar and 1.0 gms. of concentrated nitric acid are dissolved, boiled for five minutes and cooled to ambient temperature.

Solution 2.—200 cc. of distilled water, 10 grams of silver nitrate and 5.0 grams of potassium hydroxide.

Solution 3.—30 cc. of distilled water, 2.0 grams of silver nitrate.

Concentrated ammonia is added in small portions to Solution 2. As this is done, a dark precipitate is observed to form which slowly dissolves as more ammonia is added. Addition of ammonia is discontinued when the last bit of precipitate remains. To be certain that excess ammonia is not present, a small amount of Solution 3 is added to Solution 2 until a permanent dark precipitate results.

A piece of a "reticulated" open-pore polyester polyurethane foam 5 x 3½ x 1 inches having 20 open pores per linear inch, a surface area of about 450 inches per cubic inch, and weighing 8.5 gms. is placed into a glass rectangular container 5¼ x 3¾ inches and 3 inches high.

In a separate measuring cylinder about 200 cc. of the ammonia treated silver Solution 2 is mixed with 50 cc. of the reducing sugar Solution 1, and the mixture poured into the glass container. There the foam, which is fully immersed, is squeezed and decompressed, to allow the silvering fluid to penetrate fully into all pores of the foam. When the foam looks uniformly silvered and the supernatant fluid begins to turn brownish and cloudy, the silvered foam is removed and washed thoroughly with copious quantities of water until the wash water fails to show a white precipitate of silver chloride when tested for silver with hydrochloric acid. Excess water is then expressed from the foam and the foam is thoroughly dried and weighed. The increase in weight, which is actually the silver coating is 2.8 gms. and represents 33 wt. percent of the entire foam.

A 1% aqueous solution of Acramer P-250 (a polyacrylamide made by the American Cyanamid Company) is prepared by adding one gram of the polyacrylamide to 100 cc. of cold water with vigorous mixing and then heating this mixture until a clear solution is achieved. Five drops of an antifoam silicone oil (DC-200 from Dow Corning Corporation) are added. Forty grams of this solution is mixed with 30 grams of pure nickel powder, consisting of a mixture of 20 grams having an average particle size of 200 microns and 10 grams having a particle size of 44 microns. After one minute of mixing, a thixotropic, non-settling, cream-like fluid results.

The silver coated foam is thoroughly impregnated with this aqueous-thixotropic suspension of the mixed nickel powders by repeated rolling and squeezing. The impregnated wet foam is then dried with hot circulating air in a well-ventilated oven. The foam is then heated to a temperature of 260° C. by passing an electric current through the silver-coating thereby to fume off the organic foam. The remaining replicating silver structure, covered with a tight crust of the nickel powders, is next inductively heated, in the presence of hydrogen at a rate of 200° C. per hour to the sintering temperature of 1420° C. and kept at that temperature for about 5 minutes. The structure is then cooled to about 200° C., before removing it from the reducing oven atmosphere.

The resulting structure comprises a strong, coherent, open-pore nickel foam, not substantially reduced in volume over the original unsintered material, and which essentially replicates the shape, pore size and structure of the original polyurethane foam.

EXAMPLE 2

In this example the excellent electrical-conductivity of the silver coated reticulated, 100% open-pore polyester polyurethane foam, is utilized for electro depositing a nickel layer onto the silver.

A silver foam is produced in accordance with Example 1, except that the silvering is terminated when the silver layer constitutes about 5 wt. percent of the total weight of the foam. This foam is then used as a cathode in an electroplating bath containing 100 gms./liter of nickel sulfate, and 15 gms./liter of each of ammonium chloride, nickel chloride and boric acid. The anode is pure nickel. Current is flowed through the foam at a current density of about 10 amps per square foot of surface until a nickel layer constituting about 67 weight percent of the foam structure is obtained. The polyurethane foam constitutes about 30 weight percent and the silver metal undercoating about 3 weight percent.

The removal of the polyurethane substructure is achieved by heating the foam to 500° C. in the presence of hydrogen. The resulting all-metallic foam contains 4.3 weight percent silver and 96.7 weight percent nickel.

EXAMPLE 3

This example is intended to be illustrative of the formation of a reticulated, 100% open-pore inorganic foam from a high-melting, sinterable inorganic material. In this procedure, zirconium oxide is the inorganic material. Following the procedure of Example 1, a reticulated, 100% open-pore polyester polyurethane foam containing 50 pores per linear inch, is treated with the silvering solution to deposit a layer of silver on the foam. Silvering is continued until a layer constituting 25 wt. percent based on the total weight of the coated foam is obtained.

The silvered foam is then thoroughly and evenly impregnated with a thixotropic slurry containing:

30 weight percent of zirconia powder ($ZrO_2$) with a particle size of 400 microns, 15 weight percent of zirconia with a particle size of 44 microns, 5 weight percent of zirconia with a particle size of 5 microns, 49.5 weight percent of water, and 0.5 weight percent of a water-soluble thixotropic agent Acramer P–250, a polyacrylamide, from American Cyanamid Company.

The impregnated foam is carefully dried at 105° C. in an oven to a constant weight. The dried foam comprises:

(1) polyurethane core=37.5 wt. percent
(2) electro-conductive silver undercoating=12.5 wt. percent
(3) well-packed crust of $ZrO_2$=50 wt. percent plus
(4) traces of the gelling agent.

The foam is placed into a well-ventilated electric oven and heated to a temperature of 288° C. The polyurethane foam is fumed-off as volatile liquids and gases, leaving a silver metal film, upon which a coherent crust of the well-packed $ZrO_2$ particles rests. In order to sinter and fuse this structure, it is further heated in an oven with a nitrogen plasma gun to a temperature of about 2950° C. During the process the silver is evaporated while the zirconia powders sinter and fuse to a coherent, reticulated structure, fully replicating the initial polyurethane foam. The zirconia foam is slowly cooled to about 150° C. and removed from the oven.

What is claimed is:

1. The method which comprises coating a silver-plated organic foam in which the silver-layer essentially replicates the underlying organic foam structure with particles of sinterable inorganic material to form a compact layer thereof which essentially replicates the structure of said silver-layer, heat decomposing said organic foam and sintering said particles into a unitary, solid, coherent body.

2. The method according to claim 1 wherein said silver layer is coated with said sinterable inorganic material by impregnation with a highly concentrated liquid dispersion of said inorganic particles.

3. The method according to claim 2 wherein the liquid dispersion of said inorganic particles contains a thixotropic agent sufficient in amount to render said dispersion thixotropic.

4. The method according to claim 3 wherein the inorganic particles are of a metal, a metal alloy, a metal oxide, a non-metallic oxide, or a silicate.

5. The method according to claim 4 wherein the inorganic particles are of beryllium, nickel, copper, chromium, silica, platinum, gold, aluminum oxide or zirconium oxide.

6. The method according to claim 3 wherein said inorganic particles are of at least two sizes, one size being about one ninth the other.

7. The method of claim 1 wherein the organic foam is a heat decomposable polyurethane foam.

8. The method according to claim 7 wherein the polyurethane foam is essentially completely open pore.

References Cited

UNITED STATES PATENTS

| | | | |
|---|---|---|---|
| 3,408,180 | 10/1968 | Winkler | 264—44 X |
| 2,627,531 | 2/1953 | Vogt | 117—71 X |
| 2,694,743 | 11/1954 | Ruskin et al. | 117—71 X |
| 3,222,218 | 12/1965 | Beltzer et al. | 117—71 X |
| 3,238,056 | 3/1966 | Pall et al. | 117—98 |
| 3,258,363 | 6/1966 | Lieb | 264—29 X |
| 3,326,719 | 6/1967 | Beltzer et al. | 117—71 X |
| 3,353,994 | 11/1967 | Welsh et al. | 117—98 X |
| 3,367,149 | 2/1968 | Manske | 264—44 X |

ALFRED L. LEAVITT, Primary Examiner

J. R. BATTEN, JR., Assistant Examiner

U.S. Cl. X.R.

75—222; 117—46, 71, 98, 99, 127, 131, 135.1, 138.8, 227; 204—38; 264—44